US009856026B2

(12) United States Patent
Hipsky et al.

(10) Patent No.: US 9,856,026 B2
(45) Date of Patent: Jan. 2, 2018

(54) POWER AUGMENTATION FOR AN AIR CYCLE MACHINE OF AN ENVIRONMENTAL CONTROL SYSTEM

(71) Applicant: Hamilton Sundstrand Corporation, Windsor Locks, CT (US)

(72) Inventors: Harold W. Hipsky, Willington, CT (US); Donald E. Army, Jr., Enfield, CT (US); Erin G. Kline, Vernon, CT (US); Louis J. Bruno, Ellington, CT (US); Christina W. Millot, Wilbraham, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 312 days.

(21) Appl. No.: 14/688,272

(22) Filed: Apr. 16, 2015

(65) Prior Publication Data
US 2016/0304208 A1  Oct. 20, 2016

(51) Int. Cl.
*B64D 13/06* (2006.01)
*F02C 6/08* (2006.01)
*F01D 25/24* (2006.01)

(52) U.S. Cl.
CPC ............ *B64D 13/06* (2013.01); *F01D 25/24* (2013.01); *F02C 6/08* (2013.01); *B64D 2013/0648* (2013.01)

(58) Field of Classification Search
CPC ............ B64D 13/06; F01D 25/24; F02C 6/08
See application file for complete search history.

(56) References Cited

U.S. PATENT DOCUMENTS

| 3,878,692 | A | * | 4/1975 | Steves | B64D 13/06 62/172 |
| 3,904,324 | A | * | 9/1975 | Flatt | F04D 25/045 137/527 |
| 5,113,670 | A | * | 5/1992 | McAuliffe | F01D 25/125 417/406 |
| 5,427,508 | A | * | 6/1995 | Kapich | F04D 25/045 415/202 |
| 7,828,511 | B1 | * | 11/2010 | Pinera | F04D 13/043 415/221 |
| 2002/0122720 | A1 | | 9/2002 | Esa | |
| 2008/0087017 | A1 | * | 4/2008 | Van Nimwegen | F01N 3/005 60/599 |
| 2010/0021310 | A1 | * | 1/2010 | Clemen | B64C 11/14 416/245 R |

FOREIGN PATENT DOCUMENTS

GB  372134 A  5/1932

OTHER PUBLICATIONS

European Search Report Application No. 16165437.1-1754, dated Oct. 11, 2016, pp. 8.

* cited by examiner

*Primary Examiner* — Woody Lee, Jr.
(74) *Attorney, Agent, or Firm* — Cantor Colburn LLP

(57) ABSTRACT

A system that comprises a nozzle arrangement is provided. The nozzle arrangement includes at least one nozzle configured to supply a medium at a nozzle flow rate to a fan of an air cycle machine. The nozzle flow rate provides a pneumatic power assist or a power augmentation to a fan of an air cycle machine. The power augmentation, in accordance with the nozzle flow rate, reduces a need for a flow across a turbine of the air cycle machine.

13 Claims, 4 Drawing Sheets

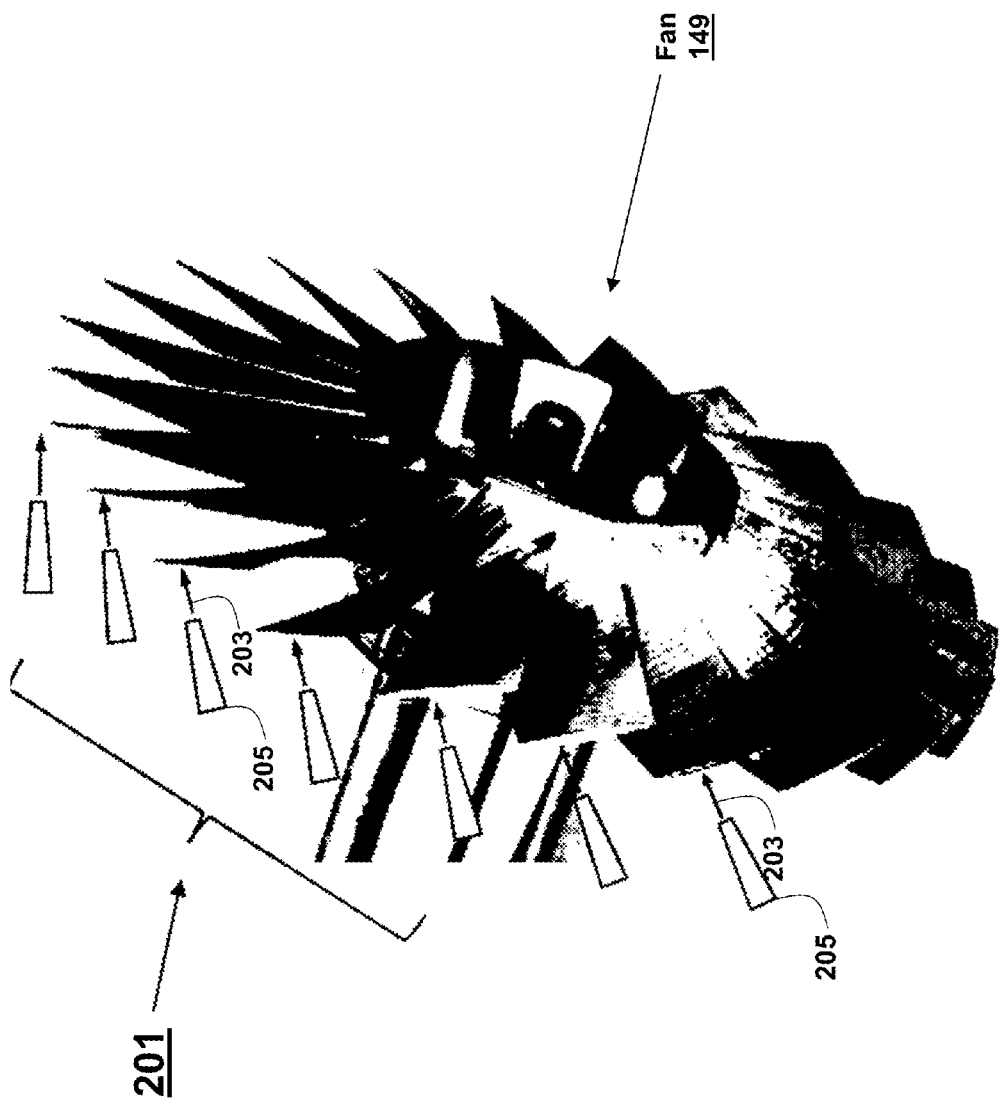

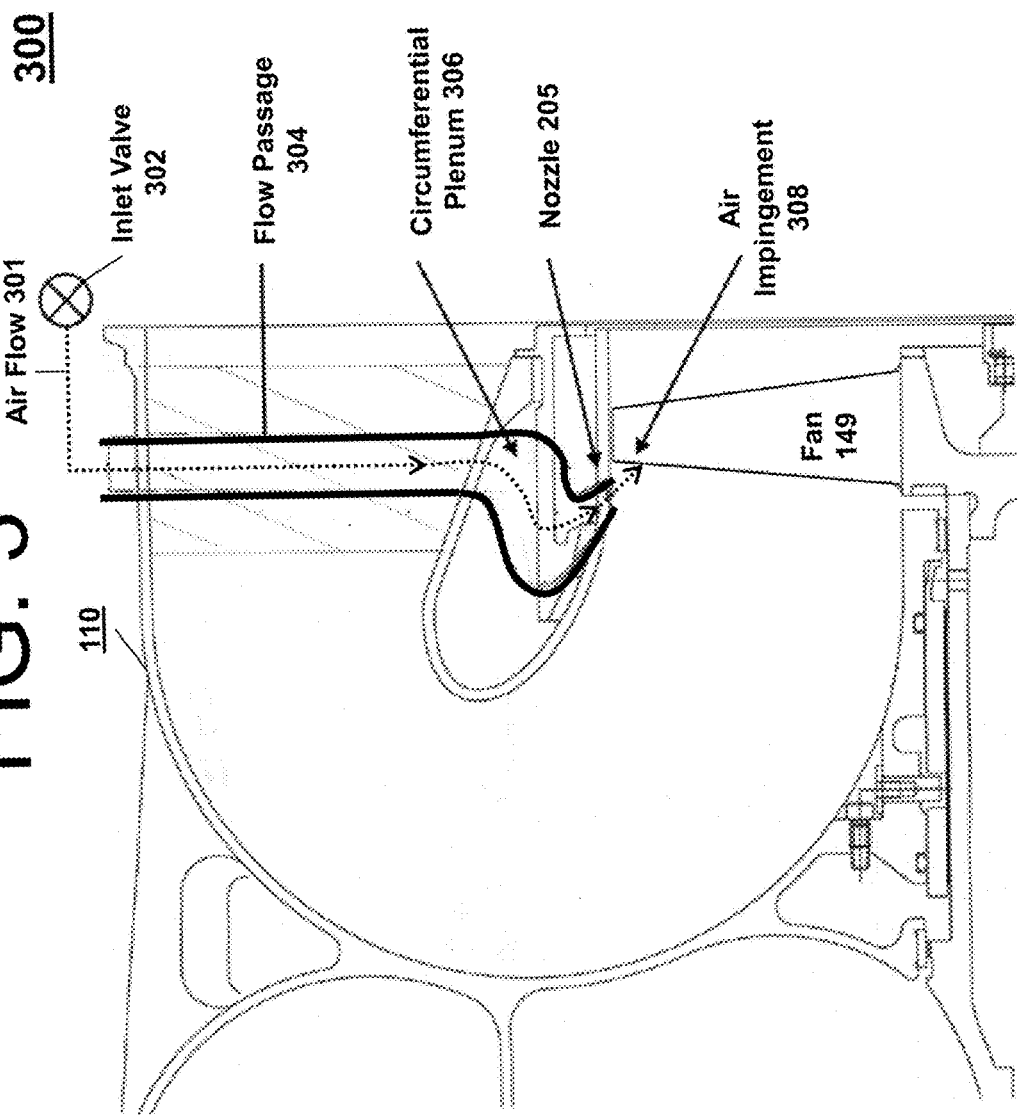

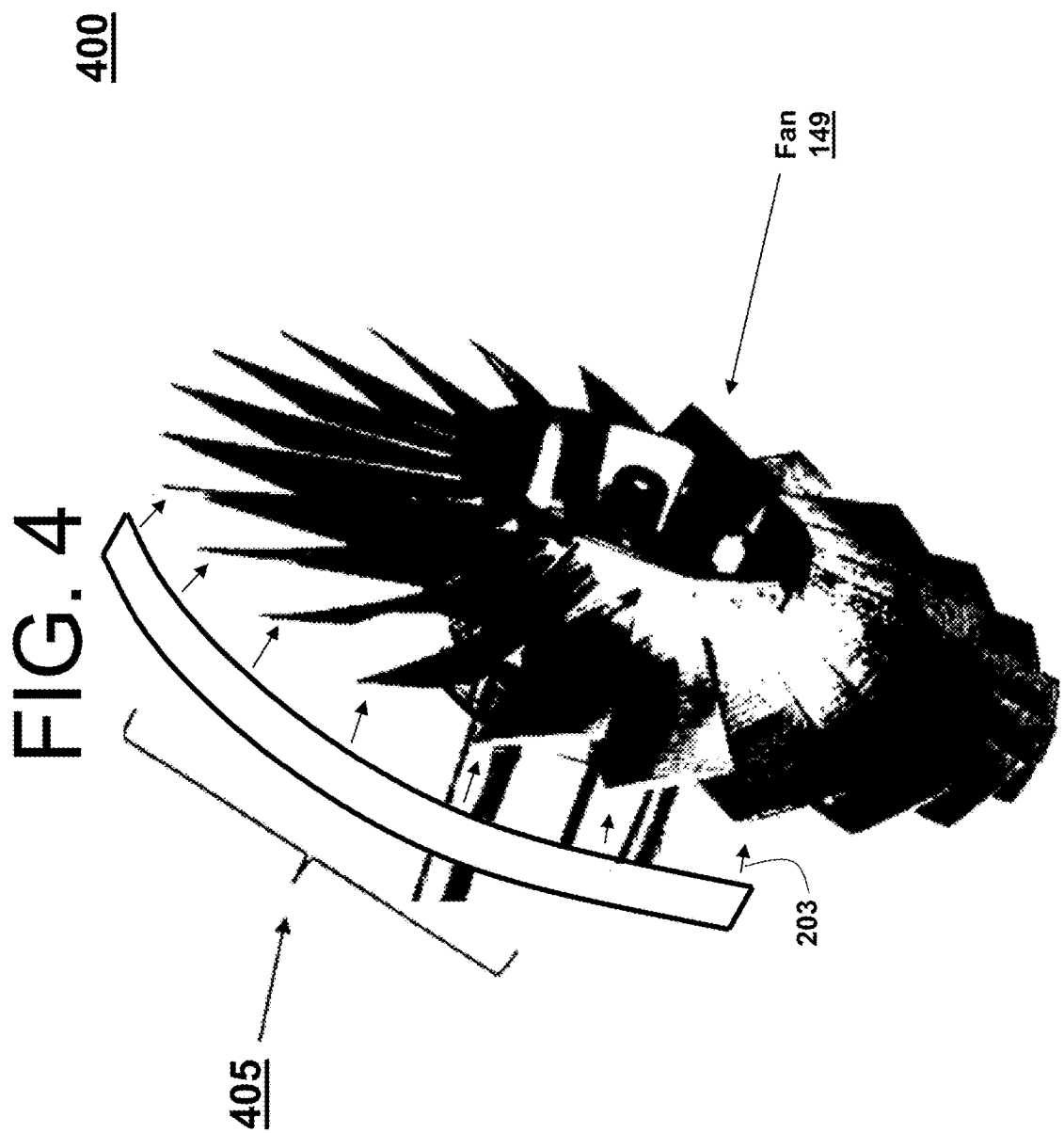

POWER AUGMENTATION FOR AN AIR CYCLE MACHINE OF AN ENVIRONMENTAL CONTROL SYSTEM

BACKGROUND OF THE INVENTION

In general, a shaft of an environmental control system pack air cycle machine of an air conditioning system must maintain an air cycle machine speed above a certain minimum value due to bearing capacity limitations of the environmental control system pack air cycle machine. For example, during altitude operation, current packs supply a flow of air to turbines of the packs to meet minimum value requirements. However, the supply of the flow of air to the turbines results in a pack flow restriction.

Because low pressure environmental control system architecture concepts desire minimum pack flow restrictions, what is needed is an alternative mechanism for maintaining a shaft speed of the environmental control system pack air cycle machine above a certain minimum value during altitude operation, where available bleed pressures are low.

BRIEF DESCRIPTION OF THE INVENTION

According to one embodiment, a nozzle arrangement is provided the nozzle arrangement comprises at least one nozzle of the nozzle arrangement configured to direct a medium to impinge on a fan of an air cycle machine.

According to another embodiment, a nozzle arrangement is provided the nozzle arrangement comprises at least one nozzle of the nozzle arrangement configured to direct a medium to impinge on an electrically driven fan that utilizes foil bearings.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 depicts a fan augmented by bleed air according to an embodiment;

FIG. 3 depicts a schematic of an air cycle machine that includes a fan augmented by bleed air according to an embodiment; and FIG. 4 depicts another schematic of an air cycle machine that includes a fan augmented by bleed air according to an embodiment.

DETAILED DESCRIPTION OF THE INVENTION

Figure 1:
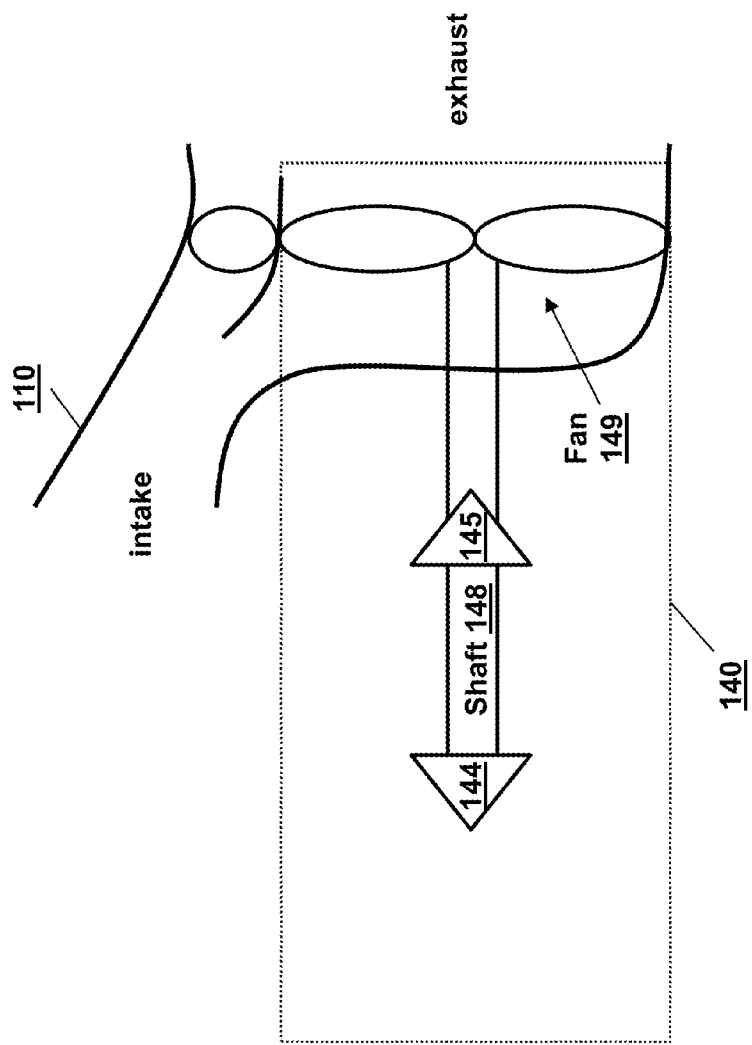
FIG. 1 depicts a schematic of an environmental control system according to an embodiment.

A detailed description of one or more embodiments of the disclosed apparatus and method are presented herein by way of exemplification and not limitation with reference to the Figures.

As indicated above, low pressure environmental control system architecture concepts desire minimum pack restrictions. Thus, embodiments herein describe an air cycle machine power augmentation mechanism for maintaining a shaft speed of the air cycle machine above a certain minimum value (e.g., at altitude operation, where available bleed pressures are low).

In general, the air cycle machine power augmentation mechanism may comprise a nozzle arrangement. The nozzle arrangement includes a plurality of nozzles, where each nozzle is configured to supply a medium at a nozzle flow rate to a fan of an air cycle machine. The nozzle flow rate provides a pneumatic power assist or a power augmentation to the fan of the air cycle machine. The power augmentation, in accordance with the nozzle flow rate, can reduce or eliminate a need for a flow across a turbine of the air cycle machine.

FIG. 1 illustrates a system 100 that includes a shell 110 coupled to an air cycle machine 140 that includes a compressor 144, a turbine 145, a shaft 148, and a fan 149.

In one embodiment, the system 100 can be any environmental control system of a vehicle, such as an aircraft or watercraft, that conditions/supplies a medium, provides thermal control, and/or provides cabin pressurization for a crew and passengers of the vehicle (e.g., a cabin air conditioning system of an aircraft). For example, on an aircraft, air is supplied to the environmental control system by being "bled" from a compressor stage of a turbine engine. The temperature and pressure of this "bleed air" varies widely depending upon which compressor stage and a revolutions per minute of the turbine engine. To achieve the desired temperature, the bleed-air is cooled as it is passed through at least one heat exchanger. To achieve the desired pressure, the bleed-air is compressed as it is passed through the compressor 144 of the air cycle machine 140. The interaction of the system 100 with the engine influences how much fuel burn by the engine is needed to perform operations, such as supplying pressurized air, related to that interaction. The system 100 may also include avionics cooling, smoke detection, and fire suppression.

The air cycle machine 140 is a mechanical device that controls/regulates a pressure of a medium (e.g., increasing a pressure of a gas). The compressor 144 is a mechanical device that raises the pressure of the bleed-air received from the first heat exchanger. The turbine 145 is mechanical device that drives the air cycle machine 140. The shaft 148 connects the compressor 144, the turbine 145, and the fan 149. The fan 149 is a mechanical device that assists in manipulating air through the shell 110 (via push or pull methods) for a variable cooling airflow across any heat exchangers contained by the shell 110. One embodiment, the fan 149 may be an electrically driven fan, an electrically driven fans that utilizes foil bearings, etc. The compressor 144, the turbine 145, and the fan 149 together illustrate, for example, that the air cycle machine 140 may operate as a three-wheel air cycle machine.

With respect to an aircraft example, the system 100 of FIG. 1 will now be described with reference to FIGS. 2-3. FIG. 2 depicts a nozzle arrangement 200 in conjunction with the fan 149 of FIG. 1 augmented by a medium 203, such as bleed air and/or cabin air, flowing from a plurality of nozzles 201 (e.g., nozzle flow) according to an embodiment.

The plurality of nozzles 201 may include at least one nozzle 205 that aligns with the fan 149. Further, a number of the plurality of nozzles 201 may vary based on a number of blades of the fan, such that a nozzle to blade ratio is 1:1, 1:2, 2:1, 1:3, etc. In one embodiment, the number of the plurality of nozzles 201 may be twenty-four.

Each nozzle 205 can be configured at an angle and/or a tapering to cause a particular nozzle flow rate to the blades of the fan 149. The angle may be an ideal angle, such that a flow path is normal to a surface of a fan blade. The tapering may be a narrowing from a first opening to a second opening at a regulated angle (e.g., between a range of 0 to 90 degrees). For example, the first opening, which receives the medium 203, may be a diameter larger than a diameter of the second opening, which exhausts the medium 203. The diameter of the second opening, which may also be referred to as an exit side of the nozzle 205, may be regulated to a specific diameter, such as a diameter between a range of 0.0 inches to 1.0 inches. The plurality of nozzles 201 may further be located at a leading edge of the fan 149 to maximize an impingement of the nozzle flow on the blades of the fan 149.

The nozzle flow rate is a pneumatic power assist to the fan 149 that provides a power augmentation to the air cycle machine 140. A nozzle flow rate of each nozzle 205 may be regulated by a size and a shape of that nozzle 205, along with a speed at which a supply of the medium 203 is provided. The nozzle flow rate may be regulated to a specific speed, such as a speed between a range of 0.0 lbs./min. to 30.0 lbs./min. The power augmentation based on the nozzle flow rate reduces or eliminates a need for a flow across the turbine 145 and nets a reduced system flow restriction (e.g., during an altitude operation to the air cycle machine 140). Thus, by regulating the medium 203 flowing to the plurality of nozzles 201, a minimum speed of the shaft 148 of the air cycle machine speed can be controlled.

Turning now to FIG. 3, a schematic of a nozzle arrangement 300 according to an embodiment as it could be installed on an aircraft is depicted. The nozzle arrangement 300 is coupled to a shell 110 housing the fan 149, such that the fan 149 is augmented by the medium 203 from the nozzle arrangement 300. The nozzle arrangement 300 illustrates an air flow 301 of the medium 203 from an inlet valve 302. The air flow 301 can be bleed air from a source, such as an engine of an aircraft; recirculated air from a cabin of an aircraft; or combination thereof.

The air flow 301 further proceeds from the inlet valve 302, through a flow passage 304 and circumferential plenum 306, and out the nozzle 205 to provide an air impingement 308 onto the fan 149.

The inlet valve 302 may be any actuator or device that regulates the flow of the medium 203 into the nozzle arrangement 300.

The flow passage 304 is a lead line, channel, or path that may be configured through an existing support strut of the shell 110, may be included in a modified support strut of the shell 110, or may be a separate lead line through the shell 110.

The circumferential plenum 306 provides the flow of the medium 203 to the nozzle 205 (e.g., at least one of the plurality of nozzles 201). The circumferential plenum 306 may encircle the shell 110. In this way, the circumferential plenum 306 enables the plurality of nuzzles to collectively surround the fan 149 and/or be oriented at an ideal angle to a leading edge of the fan 149.

In view of the above, it is possible for the plurality of nozzles 201 (e.g., individual nozzle jets) impinging on the fan 149 to excite the blades of the fan 149 to failure. Thus, in another embodiment, the circumferential plenum 306 may encircle and penetrate the shell 110 to provide a single annular nozzle around the entire circumference of the fan 149. The single annular nozzle can provide the flow of the medium 203 as a singular flow impinging on the fan. This singular flow provided by the single annular nozzle can avoid air pulsation on the blades of the fan, which in turn would avoid fan vibrations and fatigue.

For example, FIG. 4 depicts a schematic of a single annular nozzle arrangement 400 that includes a circumferential nozzle ring 405 located at an inlet of the fan 149 and injecting the medium at an optimum angle. The circumferential nozzle ring 405 can encircle the fan 149 at various degrees to provide a maximum flow (e.g., the flow of the medium 203) for fan augmentation. In this way, for example, the circumferential nozzle ring 405 accelerates the medium uniformly in a 360° circumference with no distinct nozzle jets.

The technical effects and benefits of embodiments can include utilizing a flow of cabin and/or bleed air to provides air cycle machine power augmentation during altitude operation of an aircraft. The air cycle machine power augmentation generates and maintains a minimum air cycle machine shaft speed and results in a reduced environmental control system air cycle machine flow restriction for low pressure bleed architecture concepts. Further, the minimum air cycle machine shaft speed can be maintained at all altitude operating conditions independent of air cycle machine operating conditions.

The technical effects and benefits of embodiments can include a minimization of an excitation of a fan when an air cycle machine power augmentation is activated via a 360° nozzle slot. In this way, a replacement of distinct nozzle jets by the 360° nozzle slot enhances the life of the fan.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An air cycle machine comprising a nozzle arrangement and a fan, the nozzle arrangement comprising:
    at least one nozzle directing a medium to impinge on at least one fan blade of the fan;
    an inlet valve regulating a flow rate of the medium to the at least one nozzle;
    a flow passage supplying the medium from the inlet to a circumferential plenum; and
    the circumferential plenum supplying the medium from the flow passage to the at least one nozzle.

2. The air cycle machine of claim 1, wherein the at least one nozzle impinges a medium on the at least one fan blade at a nozzle flow rate that maintains a minimum air cycle machine shaft speed for a shaft of the air cycle machine.

3. The air cycle machine of claim 1, wherein the flow passage is configured through an existing support strut of a shell housing the fan.

4. The air cycle machine of claim 1, wherein the flow passage is configured through a modified support strut of a shell housing the fan.

5. The air cycle machine of claim 1, wherein the flow passage is configured through a separate lead line to the circumferential plenum.

6. The air cycle machine of claim 1, wherein the circumferential plenum is further configured to encircle a shell housing the fan.

7. The air cycle machine of claim 1, wherein the medium is a bleed air flowing from a source external to the air cycle machine.

8. The air cycle machine of claim 1, wherein the medium is a cabin air flowing from a cabin of an aircraft.

9. The air cycle machine of claim 1, wherein the medium is a combination of a bleed air and a cabin air.

10. The air cycle machine of claim 1, wherein the at least one nozzle is a circumferential nozzle ring configured to uniformly direct the medium to impinge on the at least one fan blade at an optimum nozzle angle.

11. An aircraft comprising an environmental control system comprising the air cycle machine of claim 1.

12. A system, comprising:
    an electrically driven fan comprising foil bearings;
    at least one nozzle of the nozzle arrangement configured to direct a medium to impinge on at least one fan blade of the electrically driven fan;
    an inlet valve regulating a flow rate of the medium to the at least one nozzle;
    a flow passage supplying the medium from the inlet to a circumferential plenum; and
    the circumferential plenum supplying the medium from the flow passage to the at least one nozzle.

13. The system of claim 12, wherein the at least one nozzle impinges the medium on the at least one fan blade of the electrically driven fan at a nozzle flow rate that maintains a minimum shaft speed for a shaft of the electrically driven fan.

* * * * *